Figure 1:
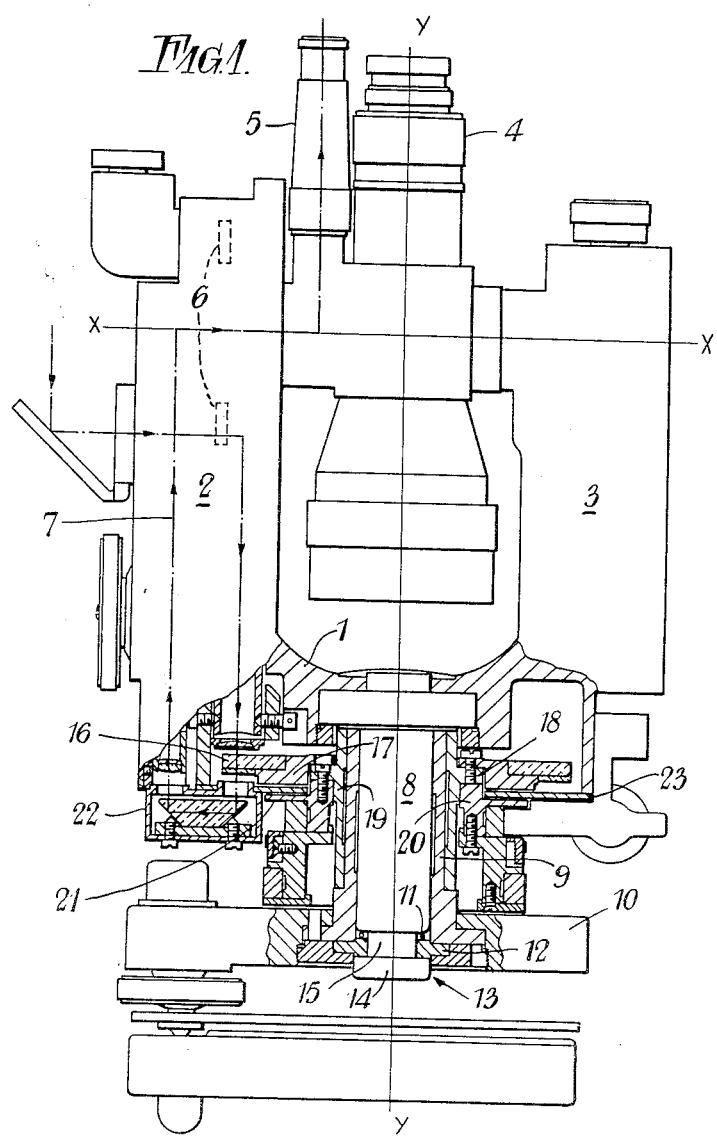

ated Aug. 20, 1963

3,101,412
SPORE GROWTH PREVENTION IN OPTICAL
INSTRUMENTS
Peter Douglas Scott-Maxwell, York, England, assignor to Cooke, Troughton & Simms Limited, York, England, a British company
Filed Aug. 5, 1957, Ser. No. 676,252
Claims priority, application Great Britain Aug. 10, 1956
2 Claims. (Cl. 250—106)

This invention relates to optical instruments and is particularly concerned with such instruments, the operational interiors of which cannot be completely sealed against the ingress of ambient air. When such instruments are employed under climatic conditions involving substantial temperature changes such as obtain in tropical or semi-tropical countries, "breathing" of the instrument, whereby air leaves and enters the unsealed body of the instrument may occur. The air entering the instrument in this way may carry with it microscopic spores which remain within the body of the instrument and, in appropriate conditions of humidity and temperature, continue their life cycle to produce for example slender mycelia which will ultimately effect an obstruction of the optical path or an obscuring of various optical elements such as to render the instrument unusable.

It has been proposed in order to overcome the difficulty just indicated, to provide instruments with a source or sources of radiation capable of inhibiting such growth of the spores at the sites that it is desired to protect. In such previous proposals relatively high-powered sources of radiation were necessary as they were disposed near to the optical elements which they were intended to protect and in consequence the radiation had to be effective over a relatively large area. Thus the use of such instruments having such relatively high-powered sources of radiation could involve a health hazard for a user which would make the instrument objectionable, particularly in those cases where the radiation sources were disposed in parts of the instrument which were in the proximity of the eye of a user.

It is an object of the present invention to substantially overcome the difficulty indicated above whilst eliminating or substantially reducing the aforementioned health hazard.

According to the present invention there is provided an optical instrument having a body provided with at least one narrow passage through which substantially all air entering or leaving the instrument must pass, the, or each passage being defined by walls which are treated to emit ionising radiation into, and extending substantially completely across the, or each, passage, whereby all air upon entering or leaving said instrument through the or each passage is irradiated in a manner substantially to inhibit from further growth spores carried on said air.

Thus the present invention facilitates the provision of an instrument in which only sources of ionising radiation of relatively low intensity need be employed in view of the fact that the radiation need only be effective across relatively narrow passages.

Figure 2:
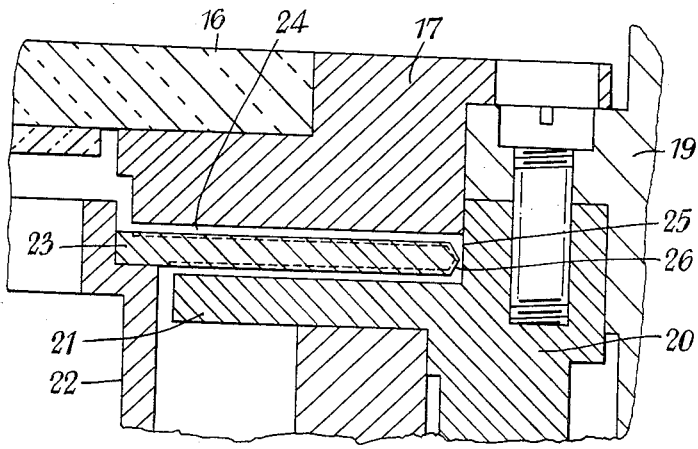
Figure 3:
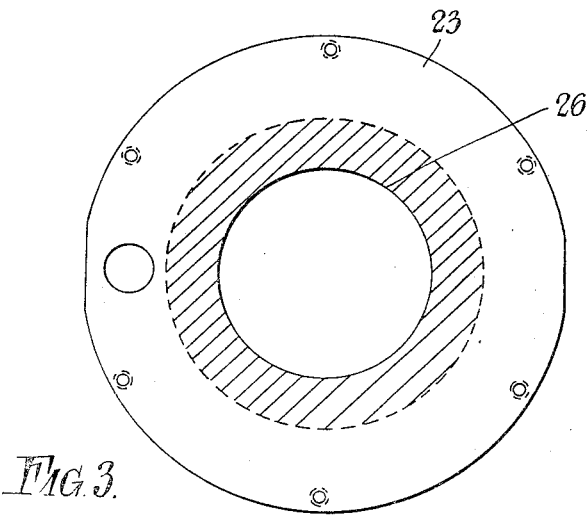

For a better understanding of the invention and to show how the same may be carried into effect reference will now be made to the accompanying drawings, in which:

FIGURE 1 is a longitudinal partial sectional elevation of an optical theodolite, FIGURE 2 is an enlarged sectional elevation of part of the theodolite, and FIGURE 3 is a plan view of a cover plate closure ring included in the theodolite.

In this particular embodiment, the invention is applied to an optical theodolite, that is to say a theodolite in which the horizontal and vertical circles are made of glass and are read optically.

Referring to FIGURE 1 of the drawings, those portions of the theodolite which are not essential to an understanding of the invention are shown in outline. As shown in FIGURE 1 the theodolite comprises a housing 1 formed integrally with two upright hollow standards 2 and 3. The housing 1 and the standards enclose the bulk of the optical elements and are largely sealed against the ingress of air. Pivoted about the upper ends of the standards 2 and 3 for rotation about the horizontal axis X—X of the instrument is a sighting telescope 4, a circle reading eyepiece 5 and vertical circles 6, the bearings (not shown) for this pivoting being sufficiently sealed to avoid the passage of air therethrough. The standard 2 forms an enclosure within which is disposed the major portion of the optical elements constituting the reading system of the theodolite of which only the vertical glass circles 6 are shown in the outlined portions of the drawing. The path of travel of light received from a sighted object and transmitted through the instrument to the circle reading eyepiece 5 is indicated by the dot-dash line 7. It is a purpose of the present invention to protect this light path from obstruction as a result of the entry into the instrument of microscopic spores as well as to prevent any subsequent growth upon the surfaces of the optical elements of such spores.

Rigidly secured to the housing 1 is a metallic tube 8 which projects into, and forms, a sliding fit within a cylindrical socket 9 rigidly secured to a levelling base 10 of the theodolite. The end of the tube 8 remote from the housing 1 rests on a ball-bearing ring 11 disposed on an annulus 12 secured to that end of the socket 9 remote from the housing 1. A cap 13 is fitted to the end of the tube 8 remote from the housing 1, the cap 13 being so shaped as to have a broadened portion 14 which prevents removal of the housing 1 from the base 10 and having a narrow portion 15 which forms a sliding fit in the bore of the annulus 12. In this way the housing 1 and the associated standards 2 and 3, telescope 4 and microscope 5 are free for rotation about the vertical axis Y—Y of the instrument, said axis passing through the centre of the tube 8.

The horizontal glass circle 16 is mounted on an annular shelf formed in an annular plate 17. The plate 17 is mounted on a flange 18 formed on a cylindrical sleeve 19, the cylindrical sleeve 19 forming a sliding fit around the outer surface of the socket 9. Thus the cylindrical sleeve 19 and in consequence, the horizontal glass circle 16 can rotate about the axis Y—Y. All bearing surfaces associated with the rotation about the vertical axis Y—Y of the housing etc., on the one hand and the horizontal glass circle 16 on the other are so formed as not to allow the passage of air between them. An annular ring 20 is secured to the underside of the flange 18 formed on the cylindrical sleeve 19. This ring 20 is provided with an outwardly directed annular flange 21, which is directed parallel to the underside surface of the annular plate 17 and extends to within a short distance of a box-like projection 22 of the housing 1. This ring 20 carries a double clamping arrangement whereby the unit which includes the horizontal circle 16 may be clamped to the unit which includes the housing 1 for rotation together with respect to the axis Y—Y or alternatively whereby the unit which includes the horizontal circle 16 may be clamped in a fixed position with respect to the levelling base 10 whilst the unit which includes the housing 1 is free for rotation alone about the axis Y—Y.

In view of the fact that the unit which includes the housing 1 and the unit which includes the horizontal circle 16 must be free for relative rotation with respect to each other about the vertical axis a free running joint must be provided between the relatively rotating parts. The requirement substantially precludes the possibility of totally sealing the instrument.

As shown in FIGURE 1, and in greater detail in FIGURE 2, an annular brass housing cover plate 23 (a plan view of which is shown in FIGURE 3) is provided for completing the partial seal of the instrument and is secured to the underside of the housing and is bolted thereto. The inner portion of this annular plate 23 extends within the gap 24 formed between the flange 21 of the ring 20 and the underside surface of the annular plate 17 to within a very small distance of the outer vertical wall 25 of the ring 20. The inner rim 26 of the cover plate 23 is bevelled so as to introduce a restriction in the gap 24.

The upper and lower surfaces and inner rim 26 of the brass plate 23 which are disposed adjacent the ring 20 and annular plate 17 are treated so as to become sources of ionising radiation directed across the gap 24 between adjacent surfaces and edges of the plate 23 and the ring 20 and plate 17. This gap 24 forms an elongated air channel into and out of the body of the instrument, the instrument being so designed and assembled, and this gap being of sufficiently large dimensions that substantially all ingress and egress of air takes place through this gap. In consequence all air upon entering the instrument is exposed to the ionising radiation given off from the treated surfaces and rim of the cover plate 23. This radiation is of sufficient intensity to inhibit any further growth of any microscopic spores carried into the instrument with the incoming air. In this way possible obstruction of the light path in the instrument due to the growth of such spores or any growth upon the optical surfaces of such spores is avoided.

It is desirable that the air passing through the gap 23 and in consequence any microscopic spores carried by the air should be subject to the maximum possible degree to the effect of the ionising radiation. In consequence the cross-section of the gap 24 through which the air must pass and which is flanked by the treated surfaces of the plate 22 should not be of too small dimensions since the narrower the gap the greater the speed of passage of air, and in consequence, the less time that any individual section of air and spores is subjected to the radiation. An appropriate width of gap has been found to be $\frac{1}{16}''$. In order, however, to prevent the entry into the instrument through the gap 2 of macroscopic objects such as for example mites, the constriction 18 is provided, this constriction being of the order of $\frac{2}{1000}$ inch in width.

It will furthermore be appreciated that since the gap 24 is of relatively narrow width the treated surfaces need produce ionising radiation of relatively low intensity, this factor taken together with the further factor that the treated surfaces are disposed in a region of the instrument which is relatively remote from the eyepiece has the result that any possible health hazard due to the presence of ionising radiation in the instrument is substantially reduced if not completely avoided.

In one particular embodiment in accordance with the invention the treatment of the cover plate to produce the source of ionising radiation takes place as follows: The plate is first of all plated with a layer of zirconium and is then exposed to a tritium hydrogen mixture. After a sufficient time of exposure zirconium hydride and zirconium tritide are formed on the surfaces and rim of the plate. Ionising radiation consisting largely of $\beta$ particles are emitted from the tritium and produce a high density of radiation in the gap 24. The range of $\beta$ particles is such that substantially the whole of the gap is filled with the radiation. Thus any microorganisms present in an air stream passing through the gap is exposed to the ionising radiation and as a result of this exposure further growth of the organisms is substantially prevented.

Whilst in the embodiment particularly described above the invention has been applied to an optical theodolite, the invention is equally applicable to other forms of optical instruments and/or components where the same or similar problems arise such as for example, binoculars, gun-sights, focussing telescopes and the like.

I claim:

1. An optical instrument comprising a body, at least one optical element in said body, a first wall portion of said body defining therein at least one optical passage operatively associated with said element, a second wall portion of said body defining therein a restricted passage through which air enters and leaves said body, said restricted passage having a cross-section which is small compared to the size of said optical element, said restricted passage being connected to but removed from said optical passage, and a source of beta radiation on said second wall portion for radiating spore inhibiting beta rays across said restricted passage whereby spores are irradiated prior to entering said optical path, said source having a strength depending on the size of said passage and independent of the size of said optical element.

2. An optical theodolite comprising at least one optical element, a plurality of movable component parts constituting a body housing said element and including a first wall portion defining at least one optical passage operatively associated with said element, said movable parts defining an elongated restricted passage through which air enters and leaves said body, said restricted passage having a cross-section which is small compared to the size of said optical element, said restricted passage being connected to but removed from said optical passage, said elongated restricted passage being provided with a constriction to prevent substantially the entry into said body of macroscopic objects, a source of beta radiation on at least one of said parts for the emission of ionising radiation across said restricted passage to irradiate all air entering said theodolite through said restricted passage to inhibit the growth of spores, said source having a strength depending on the size of said passage and independent of the size of said optical element.

References Cited in the file of this patent

UNITED STATES PATENTS

| | | |
|---|---|---|
| 2,478,955 | Vicklund | Aug. 16, 1949 |
| 2,723,349 | Rylsky | Nov. 8, 1955 |
| 2,756,840 | Maas | July 31, 1956 |